(12) United States Patent
McCann et al.

(10) Patent No.: US 10,034,260 B2
(45) Date of Patent: *Jul. 24, 2018

(54) WIRELESS LOCAL AREA NETWORK HOTSPOT REGISTRATION USING NEAR FIELD COMMUNICATIONS

(71) Applicant: Blackberry Limited, Waterloo (CA)

(72) Inventors: Stephen McCann, Southampton (GB); Michael Peter Montemurro, Toronto (CA); Sanjay Nathwani, Mississauga (CA); Roger Paul Durand, Amherst, NH (US)

(73) Assignee: BlackBerry Limited, Waterloo, Ontario (CA)

( * ) Notice: Subject to any disclaimer, the term of this patent is extended or adjusted under 35 U.S.C. 154(b) by 100 days.

This patent is subject to a terminal disclaimer.

(21) Appl. No.: 14/992,736

(22) Filed: Jan. 11, 2016

(65) Prior Publication Data

US 2016/0128015 A1    May 5, 2016

Related U.S. Application Data

(63) Continuation of application No. 13/417,658, filed on Mar. 12, 2012, now Pat. No. 9,253,589.

(51) Int. Cl.
| | |
|---|---|
| *H04W 60/04* | (2009.01) |
| *H04W 4/02* | (2018.01) |
| *H04W 48/10* | (2009.01) |
| *H04W 4/80* | (2018.01) |
| *H04W 84/12* | (2009.01) |
| *H04L 29/06* | (2006.01) |

(52) U.S. Cl.
CPC ............. *H04W 60/04* (2013.01); *H04W 4/02* (2013.01); *H04W 4/80* (2018.02); *H04W 48/10* (2013.01); *H04L 69/14* (2013.01); *H04W 84/12* (2013.01)

(58) Field of Classification Search
None
See application file for complete search history.

(56) References Cited

U.S. PATENT DOCUMENTS

| | | |
|---|---|---|
| 7,349,698 B2 | 3/2008 | Gallagher et al. |
| 7,373,109 B2 | 5/2008 | Pohja et al. |
| 7,496,344 B2 | 2/2009 | Stadelmann et al. |
| 7,580,699 B1 | 8/2009 | Shaw et al. |
| 7,623,486 B2 | 11/2009 | Caldwell et al. |
| 7,633,922 B2 | 12/2009 | Kotulla et al. |
| 7,734,293 B2 | 6/2010 | Zilliacus et al. |
| 7,738,914 B2 | 6/2010 | Joeressen |
| 7,797,243 B2 | 9/2010 | Stadelmann et al. |

(Continued)

OTHER PUBLICATIONS

ECMA International; Standard ECMA—340 Near Field Communication Interface and Protocol (NFCIP-1); 2nd Edition; Dec. 2004; 65 pages.

(Continued)

*Primary Examiner* — Kibrom T Hailu
(74) *Attorney, Agent, or Firm* — Conley Rose, P.C.; J. Robert Brown, Jr.; Joseph J. Funston, III

(57) ABSTRACT

A first device that includes a processor configured to transmit/receive a trigger message to/from a second device based on wireless short-range communication. The trigger message initiates a registration process within a wireless local area network (WLAN).

39 Claims, 9 Drawing Sheets

(56) References Cited

U.S. PATENT DOCUMENTS

| | | |
|---|---|---|
| 8,032,925 B2 | 10/2011 | Cho |
| 8,060,084 B2 | 11/2011 | Buckley et al. |
| 8,077,645 B2 | 12/2011 | Fukami et al. |
| 8,086,855 B2 | 12/2011 | Katz et al. |
| 8,116,679 B2 | 2/2012 | Dunko |
| 8,381,270 B1 | 2/2013 | Hsieh et al. |
| 8,593,255 B2 | 11/2013 | Pang et al. |
| 8,619,735 B2 | 12/2013 | Montemurro et al. |
| 8,902,839 B2 | 12/2014 | Forssell |
| 8,935,754 B2 | 1/2015 | McCann et al. |
| 8,942,211 B2 | 1/2015 | Kawakami |
| 8,942,221 B2 | 1/2015 | McCann et al. |
| 8,943,018 B2 | 1/2015 | Swanburg et al. |
| 8,943,552 B2 | 1/2015 | McCann et al. |
| 8,984,648 B2 | 3/2015 | Marcovecchio et al. |
| 9,130,651 B2 | 9/2015 | Tabe |
| 9,253,589 B2 | 2/2016 | McCann et al. |
| 2004/0090930 A1 | 5/2004 | Lee et al. |
| 2005/0038876 A1 | 2/2005 | Chaudhuri |
| 2005/0043999 A1 | 2/2005 | Ji et al. |
| 2005/0107089 A1 | 5/2005 | Fukui |
| 2005/0148359 A1 | 7/2005 | Joeressen |
| 2005/0245235 A1 | 11/2005 | Vesuna |
| 2006/0004643 A1 | 1/2006 | Stadelmann et al. |
| 2006/0159048 A1 | 7/2006 | Han et al. |
| 2006/0183462 A1 | 8/2006 | Kolehmainen |
| 2006/0206582 A1 | 9/2006 | Finn |
| 2006/0291455 A1 | 12/2006 | Katz et al. |
| 2007/0008937 A1 | 1/2007 | Mody et al. |
| 2007/0121561 A1 | 5/2007 | Yashar et al. |
| 2007/0190939 A1 | 8/2007 | Abel |
| 2007/0249365 A1 | 10/2007 | Jendbro |
| 2007/0250707 A1 | 10/2007 | Noguchi |
| 2007/0266425 A1 | 11/2007 | Cho |
| 2008/0101400 A1 | 5/2008 | Auterinen |
| 2008/0109331 A1 | 5/2008 | Stadelmann et al. |
| 2008/0125067 A1 | 5/2008 | Bells et al. |
| 2008/0130662 A1 | 6/2008 | Kotulla et al. |
| 2008/0139112 A1 | 6/2008 | Sampath et al. |
| 2008/0174405 A1 | 7/2008 | Toorn |
| 2008/0182512 A1 | 7/2008 | Waters |
| 2009/0059901 A1 | 3/2009 | Wei et al. |
| 2009/0170432 A1 | 7/2009 | Lortz |
| 2009/0196268 A1 | 8/2009 | Caldwell et al. |
| 2009/0222659 A1* | 9/2009 | Miyabayashi ...... H04L 63/0823 713/156 |
| 2009/0262716 A1 | 10/2009 | Kawakami |
| 2009/0270090 A1 | 10/2009 | Kawakami |
| 2009/0323645 A1 | 12/2009 | Fukami et al. |
| 2010/0068997 A1 | 3/2010 | Dunko |
| 2010/0106801 A1 | 4/2010 | Bliss et al. |
| 2010/0124193 A1 | 5/2010 | Prakash et al. |
| 2010/0250351 A1 | 9/2010 | Gillenson et al. |
| 2010/0271177 A1 | 10/2010 | Pang et al. |
| 2011/0072101 A1 | 3/2011 | Forssell et al. |
| 2011/0164596 A1 | 7/2011 | Montemurro et al. |
| 2011/0165859 A1 | 7/2011 | Wengrovitz |
| 2011/0205944 A1* | 8/2011 | Miyabayashi ...... H04L 63/0492 370/310 |
| 2011/0275316 A1* | 11/2011 | Suumaki ............ G06K 7/10237 455/41.1 |
| 2012/0032876 A1 | 2/2012 | Tabe |
| 2012/0040666 A1 | 2/2012 | Buckley et al. |
| 2012/0057456 A1* | 3/2012 | Bogatin ................ H04W 28/08 370/230.1 |
| 2012/0069772 A1* | 3/2012 | Byrne ................... H04W 76/02 370/255 |
| 2012/0099566 A1* | 4/2012 | Laine ................... H04M 1/7253 370/338 |
| 2012/0100803 A1* | 4/2012 | Suumaki ........... H04W 36/0072 455/41.1 |
| 2012/0265913 A1* | 10/2012 | Suumaki ............... H04W 4/008 710/303 |
| 2012/0311661 A1 | 12/2012 | Forssell |
| 2013/0019298 A1 | 1/2013 | Jover Segura et al. |
| 2013/0121325 A1 | 5/2013 | McCann et al. |
| 2013/0141567 A1* | 6/2013 | Walker ................ H04M 1/7253 348/135 |
| 2013/0160134 A1 | 6/2013 | Marcovecchio et al. |
| 2013/0176438 A1 | 7/2013 | Mate et al. |
| 2013/0222583 A1 | 8/2013 | Earnshaw |
| 2014/0141834 A1 | 5/2014 | Kim |

OTHER PUBLICATIONS

Office Action dated Mar. 7, 2014; U.S. Appl. No. 13/417,658, filed Mar. 12, 2012; 16 pages.
Final Office Action dated Jul. 28, 2014; U.S. Appl. No. 13/417,658, filed Mar. 12, 2012; 16 pages.
Office Action dated Jun. 2, 2015; U.S. Appl. No. 13/417,658, filed Mar. 12, 2012; 24 pages.
Notice of Allowance dated Sep. 25, 2015; U.S. Appl. No. 13/417,658, filed Mar. 12, 2012; 17 pages.
PCT International Search Report; Application No. PCT/US2013/029938; dated May 23, 2013; 2 pages.
PCT Written Opinion of the International Searching Authority; Application No. PCT/US2013/029938; dated May 23, 2013; 5 pages.
European Extended Search Report; Application No. 13761750.2; dated Nov. 20, 2015; 7 pages.

* cited by examiner

WIRELESS LOCAL AREA NETWORK HOTSPOT REGISTRATION USING NEAR FIELD COMMUNICATIONS

CROSS-REFERENCE TO RELATED APPLICATIONS

This application is a continuation of U.S. patent application Ser. No. 13/417,658 filed Mar. 12, 2012 by Stephen McCann, et al. entitled, "Wireless Local Area Network Hotspot Registration Using Near Field Communications", which is incorporated by reference herein as if reproduced in its entirety.

TECHNICAL FIELD

The present disclosure relates generally to network communications and, more particularly, to methods and apparatus that utilize Near Field Communication (NFC) to register with external networks in wireless network environments.

RELATED ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) locations or environments are sometimes known as "hotspots" in reference to a location or environment that is within communication range of WLAN signals. Such exemplary WLAN locations or environments include coffee shops, retail stores, home locations (e.g., homes and apartments), educational facilities, office environments, airports, public transportation stations and vehicles, hotels, etc. Such WLANs are often implemented as access networks that provide access to the Internet and may be associated with, or support access to, external networks (e.g., WLAN-supported networks) owned and/or operated by subscription-based service providers.

Wireless devices may negotiate connection, credential and other information with the external networks through a WLAN hotspot to enable registration of the wireless devices with the external networks. Current registration techniques rely on user involvement typically through the use of a user interface to register a wireless device with an external network either prior to visiting a WLAN hotspot or when the wireless device comes within communication range of the WLAN hotspot.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
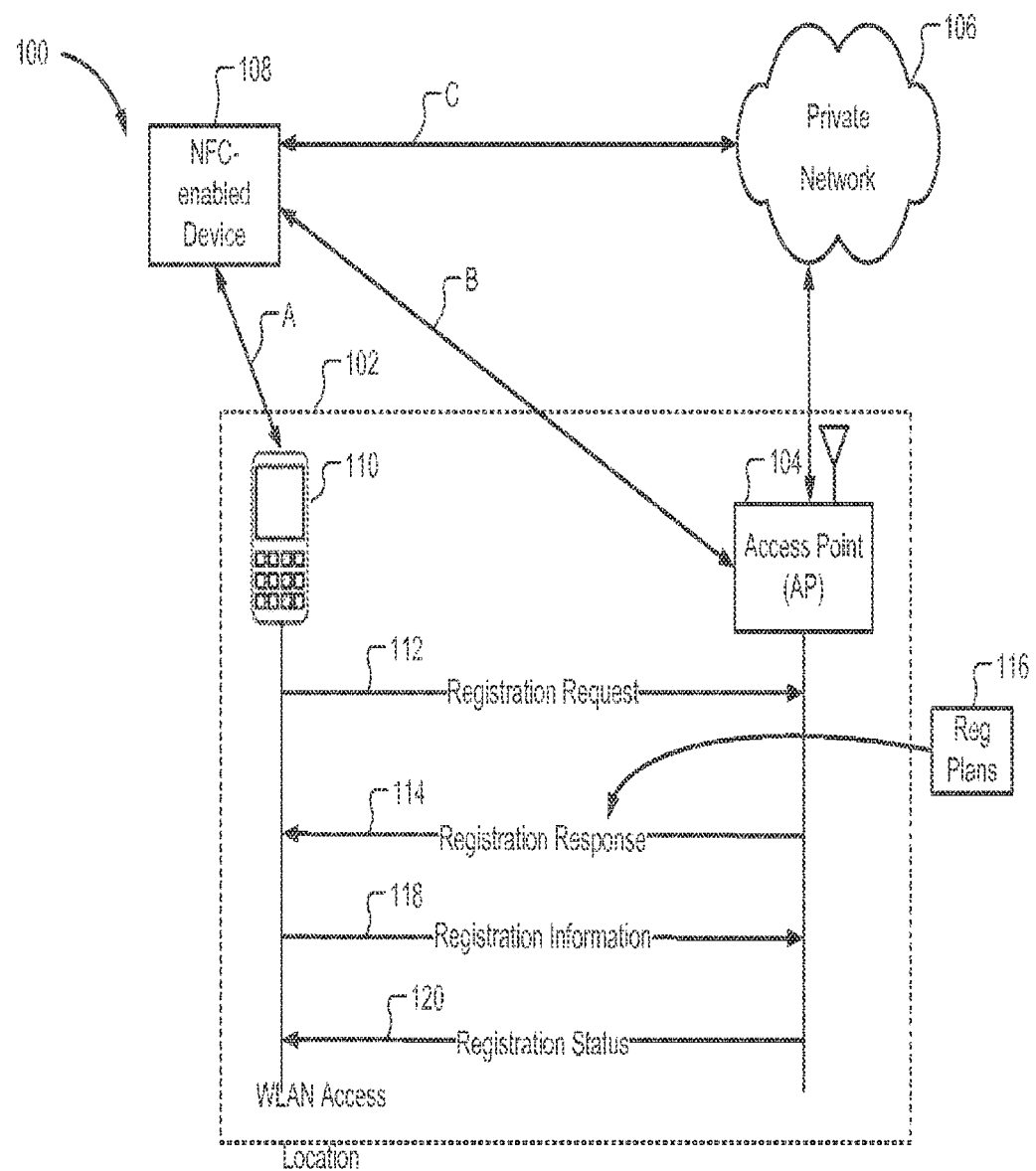
FIG. 1 depicts an exemplary communication network in accordance to the present disclosure.

It should be understood at the outset that although illustrative implementations of one or more embodiments of the present disclosure are provided below, the disclosed devices, systems and/or methods may be implemented using any number of techniques, whether currently known or in existence. The components in the figures are not necessarily to scale, emphasis instead being placed upon illustrating the principles of the disclosed technology. Moreover, in the figures, like referenced numerals designate corresponding parts or elements throughout the different views. The following description is merely exemplary in nature and is in no way intended to limit the disclosure, its application, or uses. As used herein, the phrase "coupled with" is defined to mean directly connected to or indirectly connected through one or more intermediate components. Such intermediate components may include both hardware and software based components. Further herein, the term "coupled with" is defined to mean directly connected to or indirectly connected through one or more intermediate components.

Wireless network deployments such as wireless local area networks (WLANs) are often implemented as access networks that provide access to the Internet and may be associated with, or support access to, external networks (or WLAN-supported networks) owned and/or operated by subscription-based service providers. Wireless local area networks (WLAN) locations or environments are commonly referred to as "WLAN hotspots" in reference to a location or environment that is within communication range of WLAN signals. Wireless devices may negotiate connection, credential and other information with the external networks through a WLAN hotspot to enable registration of the wireless devices with the external networks.

As noted in the background, current techniques or standards such as those defined in the Institute of Electrical and Electronics Engineers (IEEE) 802.11 require user involvement to register a wireless device with a local network or an external network. The experience associated with these techniques or standards for registering a wireless device to a local network or external network via an access point of a WLAN hotspot can be quite frustrating to a user. For example, a user of a wireless device is typically required to manually input registration information such as credentials, wireless device information, personal information (e.g., name and postal address), payment information (e.g., credit card number, account number, pre-paid account number, coupon number, etc.), terms and conditions acceptance, etc. using a user-input interface or display on the wireless device.

By way of introduction, the disclosed apparatuses and methods described herein are related to the registration of wireless devices with local networks and/or external networks via wireless network environments (e.g., WLAN hotspots). For the sake of simplicity and brevity, the present disclosure will discuss the registration of a wireless device with an external network via an access point of a WLAN hotspot. Those skilled in the art will appreciate that the apparatuses and methods of the present disclosure may also be used to register a wireless device with a local network via an access point of a WLAN hotspot.

The present disclosure utilizes short-range communications technology such as Near Field Communication (NFC) to "trigger" (i.e., initiate or prompt) the automatic registration of a wireless device with an external network through a WLAN hotspot without requiring a user of the wireless device to manually input or provide registration information via the wireless device. As discussed in detail below, in various embodiments, registration of a wireless device with an external network may be automatically initiated based on the wireless device being within or coming into "range" (i.e., positional proximity enabling the communication of data) of a NFC-enabled device or passive NFC device such as a NFC tag or card.

The wireless devices utilized in the present disclosure may include mobile communication devices, mobile computing devices, or any other device capable of communicating wirelessly with a wireless network. Such devices may also be referred to as terminals, wireless terminals, stations (STAs) or user equipment (UE), and may also include mobile smart phones and tablets (e.g., a BlackBerry® smart phone or BlackBerry® Playbook), wireless personal digital assistants (PDA), machine to machine equipment, equipment within a smart grid ("SmartGrid"), equipment within a mesh network (an ad-hoc or peer network), laptop/notebook/netbook computers with wireless adapters, etc.

The registration and/or connectivity of the wireless device with an external network (e.g., subscription service provider network (SSPN) or a hotspot provider) via a wireless network may occur through standards that define access, control, and communications in networks, such as the communication standard known as IEEE® (Institute for Electrical and Electronics Engineers) 802.11. Alternatively, the network registration and connectivity may be subject to other parts of the IEEE 802.11 standard and other wireless communication standards or specifications including WLAN standards including any IEEE® 802.xx standard (e.g. IEEE 802.15, IEEE 802.16, IEEE 802.19, IEEE 802.20, and IEEE 802.22), personal area network (PAN) standards, wide area network (WAN) standards, cellular communication standards, or the Wi-Fi Alliance® (WFA) Hotspot 2.0 specifications (also referred to as Wi-Fi CERTIFIED Passpoint™).

Registration of the wireless device with an external network may be implemented in many environments providing WLAN access for network connectivity or in WLAN access locations or environments in which it may be expected that one or more users carrying respective wireless terminals will associate with (i.e., join or connect to) and disassociate from a wireless network, access point, or WLAN as they enter and exit the WLAN access locations or environments. As discussed above, some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc.

Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service and can use wireless network access and/or Internet-access services based on such a subscription when the subscriber is in communication proximity of the WLAN with an appropriate wireless device. In some instances, different WLANs may provide access to different types of network information. For example, some WLANs may provide access to particular subscription service provider networks, and some WLANs may support roaming agreements to allow connections from wireless terminals associated with different SSPs.

Referring now to FIG. 1, an exemplary system architecture that implements the apparatus and methods of the present disclosure is shown. In the present embodiment, the system architecture includes a WLAN access location 102 having an access point (AP) 104 that provides access (i.e., communication) to a private network 106 (e.g., WLAN-supported network or external network). The WLAN access location 102 and the private network 106 respectively communicate with a short-range communications technology-enabled device. For example, in the present embodiment, a NFC-enabled device 108 is employed. The NFC-enabled device 108 is integrated as a component of the WLAN hotspot infrastructure (not shown) through path B or through path C to the private network 106 as illustrated in FIG. 1. Paths B and C may respectively be secure wired (e.g., USB link) or secure wireless (e.g., Bluetooth) connections. The NFC-enabled device 108 may be positioned at various locations within a WLAN access location 102 or close to the WLAN access location 102 (i.e., not within the WLAN access location 102). For example, the NFC-enabled device 108 may be positioned at an entry point into a coffee shop, amusement park, or metro system or perhaps near a point of sale (POS) or point of purchase (POP). In various embodiments, text, branding, decal, and/or a logo may be placed on the NFC-enabled device 108 to indicate to users that the NFC-enabled device 108 is connected to or associated with a WLAN hotspot. The text, branding, decal, and/or logo may be utilized in conjunction with all WLAN hotspots or alternatively just with WLAN hotspots configured in accordance with the WFA Hotspot 2.0 specifications.

Those skilled in the art will appreciate that various embodiments of the system depicted in FIG. 1 of the present disclosure may utilize other short-range communication technologies including, but not limited to, BLUETOOTH®, ZIGBEE®, wireless Universal Serial Bus (USB), or an ultra-wideband (UWB) technologies. Furthermore, although the present embodiment depicts a single WLAN access location 102, a single private network 106, and a single NFC-enabled device 108, a variable number of WLAN access locations 102, private networks 106, and NFC-enabled devices 108 are contemplated.

NFC technology is typically used for contactless short-range communications based on radio-frequency identification (RFID) standards, using magnetic field induction to enable communication between electronic devices such as wireless terminals (e.g., wireless terminal 110). NFC, as standardized in ECMA-340 and ISO/IEC 18092, incorporates existing standards including ISO/IEC 14443A, ISO/

IEC 1443B, and FeliCa, all of which are hereby incorporated by reference in their entirety. A NFC-enabled device such as a wireless terminal typically includes an NFC integrated circuit (IC) chip (or simply referred to as a NFC chip) that communicates to such devices as existing ISO 14443 smart cards, tags, readers and/or other NFC-enabled devices and is compatible with any existing contactless infrastructure. The NFC chips use magnetic field induction where two loop antennas are located near each other and form an air-core transformer. The technology operates on the unlicensed radio frequency industrial, scientific and medical (ISM) band of about 13.56 megahertz (MHz) and has a bandwidth of about 2 MHz. The working distance (i.e., the range) is usually about 0 to 20 centimeters. A user of the NFC-enabled device brings the NFC-enabled device close to (i.e., within proximity of) another NFC-enabled device or passive NFC device to initiate NFC communication, with data rates ranging from 106 to about 424 kilobits per second (kbit/s). Passive NFC devices (in some scenarios, referred to as "target" devices) may be implemented in various form factors such as tags, stickers, key fobs, or cards. As noted above, the NFC protocol operates within the globally available and unregulated radio frequency band of 13.56 MHz and has a working distance of up to 20 centimeters. Three data rates are typically available in accordance with the NFC protocol: 106 kbit/s, 212 kbit/s, and 424 kbit/s. The NFC protocol enables multiple modes of communication between devices. For example, an NFC-enabled device may operate in reader/writer mode, Peer-to-Peer mode, or in Card Emulation mode. In reader/writer mode, a NFC-enabled device is capable of reading NFC Forum-mandated tag types. In Peer-to-Peer mode, a NFC-enabled device can exchange data with another NFC-enabled device. In Card Emulation mode, the NFC-enabled device appears much like a contactless smart card to an external reader. An NFC tag is typically a passive NFC device that stores data capable of being read by an NFC-enabled device. In the present disclosure, the wireless terminal 110, in addition to the NFC-enabled device 108, is configured as a NFC-enabled device. Those skilled in the art will appreciate that, in various embodiments, the wireless terminal 110 and/or the NFC-enabled device 108 may alternatively be configured to passive NFC devices or target NFC devices.

Referring back to FIG. 1, in various embodiments, the private network 106 may be a subscription service provider network (SSPN) owned or operated by a data subscription service provider, Internet subscription service provider, media (e.g., audio/video) subscription service provider, wireless communications subscription service provider, or any combination thereof. The private network 106 may be connected to the Internet (not shown) and may, for example, provide subscription-based Internet access to wireless terminals. In some implementations, roaming agreements between different subscription service providers may enable the private network 106 to support roaming connections for wireless terminals associated with other subscription service providers.

The WLAN access location 102 illustrates a wireless terminal 110 in wireless range of the AP 104. The wireless terminal 110 is further described with respect to FIG. 8. The AP 104 connects with the private network 106, which may provide a direct or indirect connection to other networks (not shown), including publicly accessible network like the Internet. Further, in various embodiments, the AP 104 and/or the wireless terminal 110 may communicate with the NFC-enabled device 108 (also referred as the NFC pad 108 or NFC touchpoint 108). The AP 104 (also referred to as a WLAN AP) is provided with an AP station (i.e., an AP STA), which is the interface or component, such as a network adapter or network interface card (NIC), that provides access to distribution services via a wireless medium for associated stations (e.g., non-AP STAs). In the illustrated examples described herein, the AP 104 includes an AP STA, while the wireless terminal 110 that communicates with the AP 104 includes a non-AP station (i.e., a non-AP STA). Further, the wireless terminal 110 includes one or more NFC components (e.g., a NFC chip, NFC tag, smart card, and/or other NFC hardware, software, and/or firmware required to configure the wireless terminal 110 to be an NFC-enabled device). In other embodiments, the NFC component may be located external to the wireless terminal 110 and may be tethered to (i.e., in communication with) the wireless terminal 110 by a secure wired (e.g., USB) or a secure wireless (e.g., Bluetooth) connection.

NFC components such as NFC tags may securely store data associated with a user of a wireless terminal. In the present implementation, the NFC component contained within the wireless terminal 110 stores credential information associated with a user of the wireless terminal 110 and/or the wireless terminal 110 itself. For example, the credential information stored by the NFC component may include, but is not limited to, identifiers and types of authentication parameters such as various credentials types (e.g., SIM, USIM, eUICC, NFC Secure Element, Hardware Token, Softoken, Certificate, username/password) that may be required by the wireless terminal 110 for registration with a WLAN hotspot. As discussed in with reference to FIG. 4, different values (e.g., "0", "1", "2", etc.) may be utilized to indicate different credential types that may be provided by the wireless terminal 110. In other embodiments, the NFC component may add or alternatively securely store personal data such as a user name, residence address, email address, telephone number, debit and credit card information, loyalty program data, PINs and/or networking contacts, etc. Currently, NFC tags are categorized into four different types. NFC tags are categorized into these four types based on characteristics such as compatibility, dimensional size, memory size, price, and content type (e.g., static content or dynamic content).

The WLAN access location 102 may be associated with different hotspot registration plans. Each hotspot registration plan includes a set of registration parameters indicative of registration information required of the wireless terminal 110 to register with the private network 106 through the AP 104 based on that registration plan. The registration plans and their corresponding sets of registration parameters can be selected by the owner or operator of the private network 106 based on different factors such as, for example, subscription usage plans, desired security levels, business objectives, etc. Registration information may include a user name, residence address, email address, telephone number, debit and credit card information, loyalty program data, PINs and networking contacts, etc. Accordingly, to connect with the AP 104, the wireless terminal 110 must meet the criteria specified by the owner or operator of the private network 106, otherwise connection with the AP 104 is not allowed. Different registration plans may be related to different network access charging/pricing structures or different wireless device roaming agreements. For example, the private network 106 may allow registration of wireless terminals based on less or no registration information.

As shown generally in connection with the WLAN access location 102, the wireless terminal 110 can communicate a registration request message 112 to the AP 104. In response to the registration request message 112, the wireless terminal 110 receives a registration response message 114, transmitted from the AP 104, which includes one or more selectable registration plans (Reg Plans) 116. Each registration plan 116 includes a respective set of registration parameters indicative of registration information required by the private network 106 to allow the wireless terminal 110 to register therewith. The wireless terminal 110 then communicates a registration information message 118 to the AP 104. The registration information message 118 includes a selected (e.g., user-selected or terminal-selected) registration plan 116 as well as the registration information indicated as required by the selected registration plan. After the AP 104 verifies with the private network 106 that the registration information provided via the registration information message 118 allows or does not allow network registration of the wireless terminal 110, the AP 104 communicates a registration status message 120 to the wireless terminal 110. The registration status message 120 indicates to the wireless terminal 110 whether network registration was successful or failed. In addition, if the network registration failed, the registration status message 120 can also include a listing of the invalid registration information that caused the network registration failure. In this manner, the wireless terminal 110 may provide different information in place of the registration information indicated as invalid. In other embodiments, the wireless terminal 110 may choose to select or request an alternative registration plan 116.

In the present embodiment, the wireless terminal 110 and the AP 104 exchange the messages 112, 114, 118, and 120 while operating in a "registration" state (e.g., while the wireless terminal 110 is registering with the AP 104, the wireless terminal 110 being in a pre-associated state relative to the WLAN hotspot). The WFA Hotspot 2.0 program defines the registration state as the period in which a mobile device is setting up (e.g., registering or initiating) an existing or new subscriber account with a service provider or hotspot provider to obtain WLAN access. For example, registration of a mobile device (e.g., the wireless terminal 110) may be initiated when the mobile device initially comes within range of a NFC reader (e.g., NFC-enabled device 108). In other embodiments, re-registration of the mobile device may be initiated following the expiration (or revoking) of the user's credentials.

Figure 2:
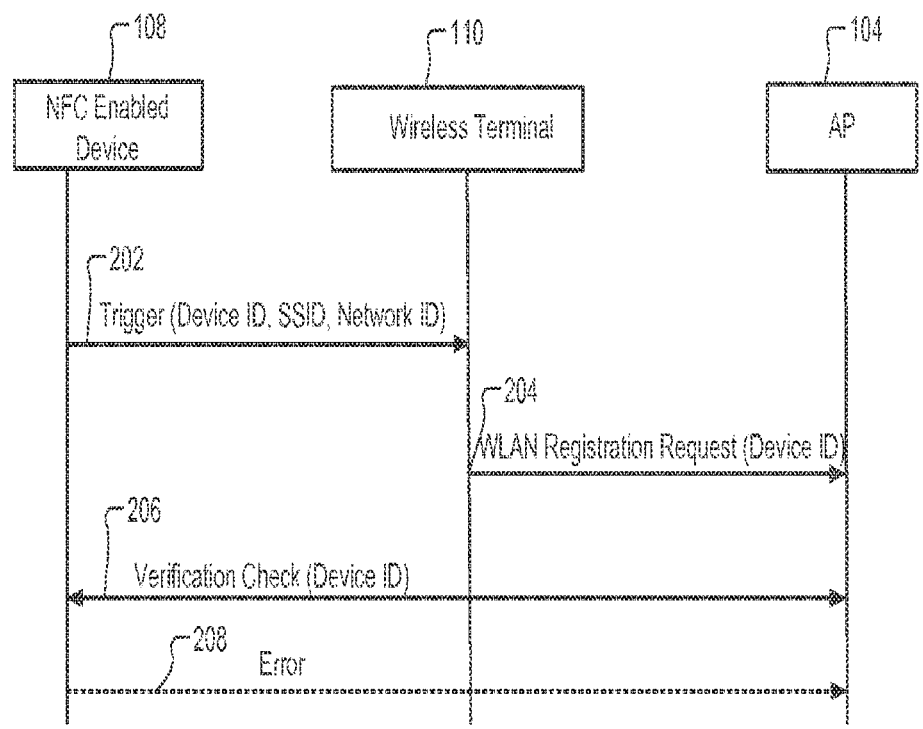
FIG. 2 depicts an exemplary embodiment of a message flow for a NFC trigger operation in accordance with the present disclosure.

Referring now to FIGS. 1 and 2, an exemplary embodiment of a message flow for a NFC trigger operation for WLAN hotspot registration (also referred to herein simply as hotspot registration or WLAN registration) is discussed in more detail. When the wireless terminal 110 is within communication range of the NFC-enabled device 108 (i.e., close to or within the WLAN access location 102), at 202, a trigger message is transmitted over path A from the NFC-enabled device 108 and is received by the NFC component within the wireless terminal 110. The trigger message serves to identify the NFC-enabled device 108 as part of the WLAN hotspot infrastructure. The trigger message transmitted by the NFC-enabled device 108 may include an element such as a service set identifier (SSID) that identifies the WLAN hotspot available within the WLAN access location 102. For the sake of simplicity and brevity, the present disclosure will discuss obtaining access to a single WLAN hotspot although a variable number of WLAN hotspots (i.e., wireless LANs) may be available within the WLAN access location 102. For example, the NFC-enabled device 108 may simultaneously transmit SSIDs of different WLAN hotspots. Further, in the present disclosure, an "element" may constitute a parameter, value, information element, identifier, or other data or information. The trigger message may further include an element (e.g., a NFC device identifier (device ID)) that uniquely identifies the NFC-enabled device 108 and an element such as a network identifier that identifies the network (e.g., local network or external network) to which the WLAN hotspot is connected to or associated with. Examples of a network identifier include, but are not limited to, homogeneous extended service set identifiers (HESSIDs), public land mobile networks (PLMNs), network access identifier (NAI) Realms, organization identifiers (OIs), fully qualified domain names (FQDNs), Domain Names, and/or Friendly Names.

Upon receiving the trigger message, the wireless terminal 110 may determine whether to initiate the registration process discussed in FIG. 1. In other words, the NFC connection between the NFC-enabled device 108 and the wireless terminal 110 may trigger a hotspot registration process. In order to initiate the hotspot registration process, at 204, the wireless terminal 110 transmits a WLAN registration request message to the AP 104. The wireless terminal 110 includes the device ID received from the NFC-enabled device 108 within the WLAN registration request message. Upon receiving the WLAN registration request message (with device ID), the AP 104 can identify the NFC-enabled device 108. At 206, the AP 104 utilizes the device ID in a verification check message to verify (i.e., validate) whether the NFC-enabled device 108 is securely connected to or securely associated with the WLAN hotspot infrastructure The verification check message may be transmitted over paths B or C to the NFC-enabled 108. If the device ID cannot be validated by the NFC-enabled device 108, at 208, an error message may be transmitted by the NFC-enabled device 108 to the AP 104 indicating that the hotspot registration process should be terminated.

Figure 3:
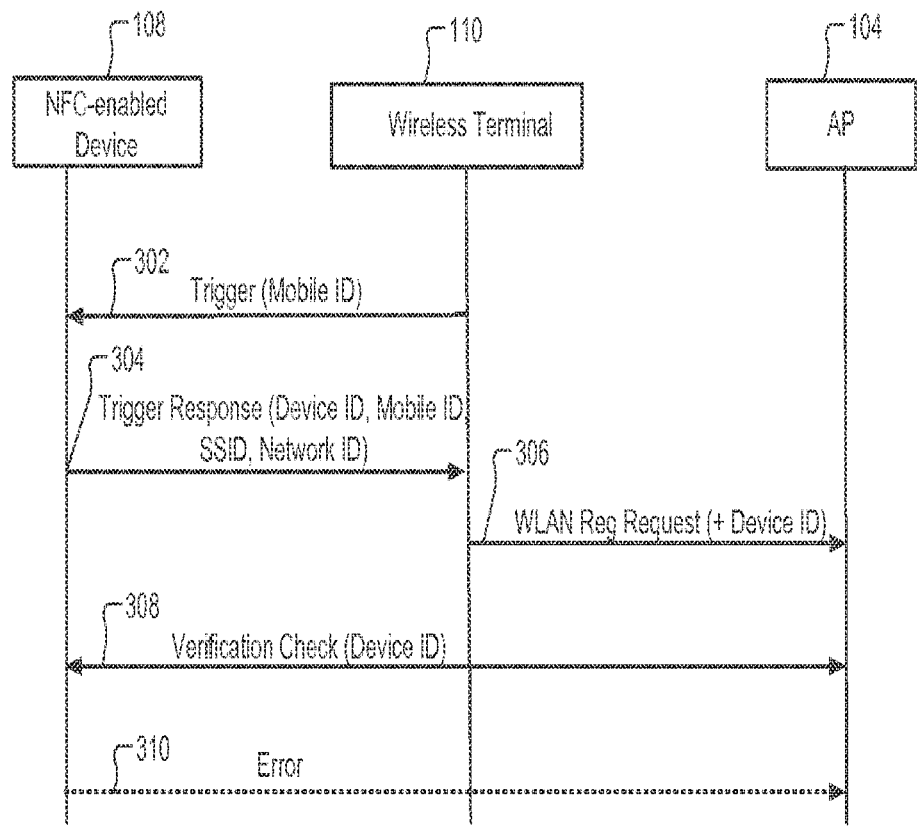
FIG. 3 depicts another exemplary embodiment of a message flow for a NFC trigger operation in accordance with the present disclosure.

Referring now to FIGS. 1 and 3, another exemplary embodiment of a message flow for a NFC trigger operation for WLAN hotspot registration is discussed in more detail. When the wireless terminal 110 is within communication range of the NFC-enabled device 108 (i.e., close to or within the WLAN access location 102), at 302, the wireless terminal 110 is configured to transmit a trigger message over path A to the NFC-enabled device 108. In the present embodiment, the wireless terminal 110 is configured to automatically transmit the trigger message when the wireless terminal is within range of the NFC-enabled device 108 though other configurations of operation of the wireless terminal 110 are anticipated. The trigger message transmitted by the wireless terminal 110 includes an element (e.g., a mobile ID) that identifies the wireless terminal 110. In response to receiving the trigger message, at 304, the NFC-enabled device 108 transmits a trigger response message to the wireless terminal 110. The trigger response message may include the SSID that identifies the WLAN hotspot available within the WLAN access location 102 as well as the device ID that uniquely identifies the NFC-enabled device 108, a network identifier that identifies a network (e.g., local network or external network) to which the WLAN hotspot is securely associated with or securely connected to, and a mobile ID.

The wireless terminal 110 may validate the trigger response message received from the NFC-enabled device 108 against the trigger message that the wireless terminal 110 initially transmitted. More specifically, the wireless terminal 110 may determine whether the mobile ID received within the trigger response message is the same as the mobile ID transmitted by the wireless terminal 110. If the mobile ID received from the NFC-enabled device 108 is incorrect (i.e., if the mobile ID received from the NFC-enabled device 108 is not the same as the mobile ID transmitted by the wireless terminal 110), the wireless terminal 110 may reject messages from the NFC-enabled device 108. In various embodiments, other elements such as a random unique identifier or an encrypted version of the mobile ID may be used in place of the mobile ID in the trigger message and trigger response message. A random unique identifier uniquely and randomly identifies each respective transaction (i.e., message) transmitted from the NFC-enabled 108. An encrypted version of the mobile ID may include a nonce (i.e., a random or pseudo-random number used to "sign" an encrypted communication).

Referring back to FIG. 3, upon receiving the trigger response message, the wireless terminal 110 may determine whether to initiate the WLAN registration process discussed in FIG. 1. If the wireless terminal 110 elects and/or is configured to initiate the WLAN registration process, the wireless terminal 110 transmits a WLAN registration request message to the AP 104 at 306. The wireless terminal 110 includes the device ID received from the NFC-enabled device 108 within the WLAN registration request message. Upon receiving the WLAN registration request message (with device ID), the AP 104 can identify the NFC-enabled device 108. Within message 308, the AP 104 utilizes the device ID in a verification check to verify (i.e., validate) whether the NFC-enabled device 108 is securely associated with or securely connected to the WLAN hotspot infrastructure. The verification check message may be transmitted over paths B or C to the NFC-enabled device 108. If the device ID cannot be validated by the NFC-enabled device 108, at 310, an error message may be transmitted by the NFC-enabled device 108 to the AP 104 indicating that the WLAN registration process should be terminated.

Figure 4:
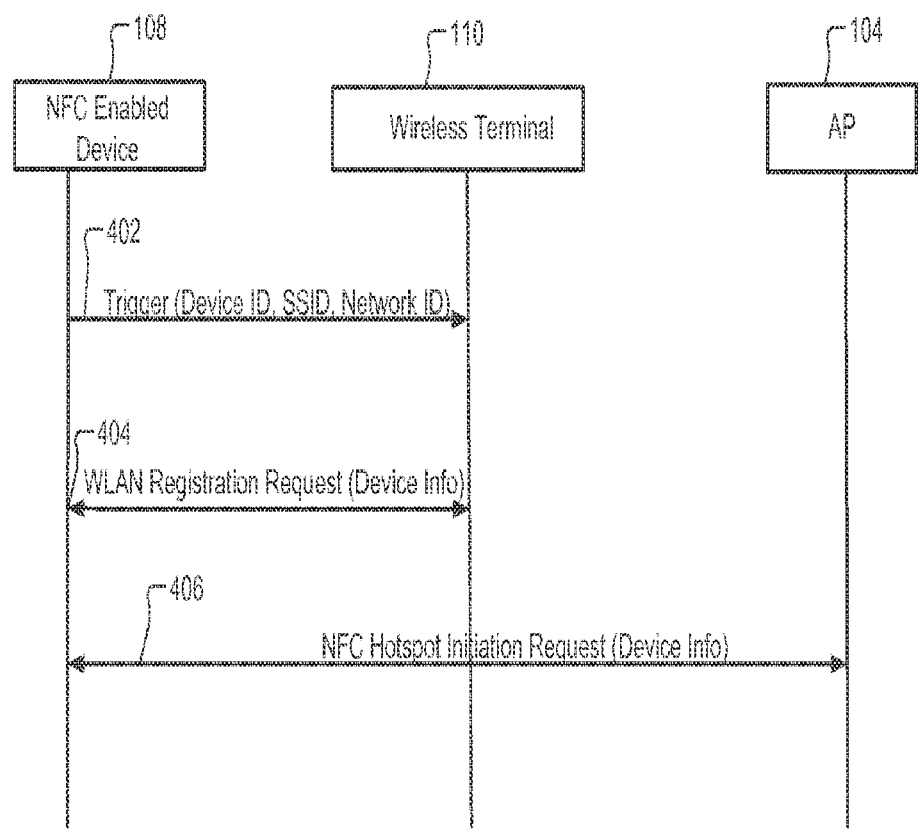
FIG. 4 depicts an exemplary embodiment of a NFC hotspot initiation in accordance with the present disclosure.

Referring now to FIGS. 1 and 4, an exemplary embodiment of a NFC hotspot initiation operation is discussed in more detail. In this embodiment, the NFC-enabled device 108 operates to commence the WLAN registration process between itself and the WLAN hotspot. As described below, the NFC hotspot initiation operation of the present embodiment enables the WLAN registration transactions (e.g., messages 112, 114, 118, and 120) described in FIG. 1 to be communicated between the NFC-enabled device 108 and the wireless terminal 110 using path A. When the wireless terminal 110 is within communication range of the NFC-enabled device 108, at 402, a trigger message is transmitted over path A from the NFC-enabled device 108 and is received by the NFC component within the wireless terminal 110. The trigger message serves to identify the NFC-enabled device 108 as securely connected to or securely associated with the WLAN hotspot infrastructure. In the present embodiment, the trigger message transmitted by the NFC-enabled device 108 includes a SSID, a device ID, and a network identifier.

As previously discussed with reference to FIGS. 2 and 3, upon receiving the trigger message, the wireless terminal 110 determines whether to initiate the WLAN registration process. If the wireless terminal 110 elects and/or is configured to initiate the WLAN registration process, the wireless terminal 110 transmits a WLAN registration request message to the NFC-enabled device 108 using path A at 404. The WLAN registration request message includes "device information" (Device info) such as, but not limited to, identifier(s) and/or authentication credential types associated with the wireless terminal 110 and/or the NFC-enabled device 108. For example, the WLAN registration request message may include a credential type value of "7" which indicates that a username and password pair (i.e., a type of credential) is present and available in the wireless terminal 110. In other words, credential values (e.g., the actual username and password stored at the wireless terminal 110) are not transmitted to the NFC-enabled device 108. The WLAN registration request message is encapsulated (i.e., contained within) a NFC Data Exchange Format (NDEF) message during transmission to the NFC-enabled device 108.

Upon receiving the WLAN registration request message (including device information), the NFC-enabled device 108 processes and converts the WLAN registration request message into a NFC hotspot initiation request message. The NFC hotspot initiation request message includes the device information transmitted from the wireless terminal 110. At 406, the NFC-enabled device 108 commences the WLAN registration process, as described with reference to FIG. 1, using either path B or C. In other words, messages 114, 118, and 120 are relayed from the wireless terminal 110 to the NFC-enabled device 108 over path A and then further transmitted from the NFC-enabled device 108 to the AP 104. Similar to the WLAN registration request message, messages 114, 118, and 120 are encapsulated within respective NDEF messages during transmission to the NFC-enabled device 108.

In the present embodiment, communications between the NFC-enabled device 108 and the AP 104 via paths B or C are transmitted over a transport protocol (e.g., extensible authentication protocol or session initiation protocol) and not over the WLAN hotspot air interface. In other words, the WLAN hotspot air interface is not utilized for the WLAN registration transactions (e.g., messages 112, 114, 118, and 120). Therefore, in the present embodiment, an operator of the WLAN hotspot may only accept WLAN connections from pre-registered users. In accordance with this embodiment, a WLAN hotspot may be configured such that each user must bring their respective wireless terminal within range of a NFC-enabled device prior to using (i.e., associating with) the WLAN hotspot. For example, wireless terminals that previously associated with the WLAN hotspot may utilize this embodiment to verify whether their respective credentials and/or subscriptions are still valid. If the credentials and/or subscriptions of a given wireless terminal are no longer valid, the wireless terminal may be prompted to re-register with the WLAN hotspot.

Figure 5:
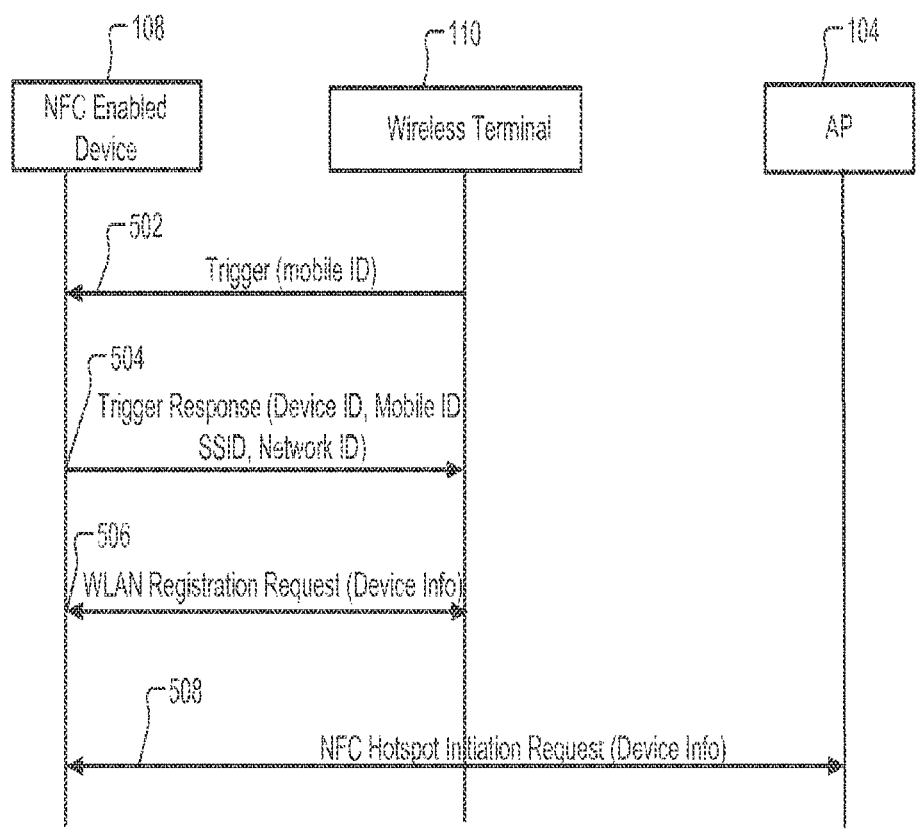
FIG. 5 depicts another exemplary embodiment of a NFC hotspot initiation in accordance with the present disclosure.

Referring now to FIGS. 1, 4, and 5, another exemplary embodiment of the NFC hotspot initiation operation is discussed in more detail. In the NFC hotspot initiation operation of FIG. 5, the trigger message originates at the wireless terminal 110. Specifically, when the mobile terminal 110 is within communication range of the NFC-enabled device 108, at 502, a trigger message is transmitted over path A from the wireless terminal 110 and is received by the NFC-enabled device 108. The trigger message transmitted by the wireless terminal 110 includes a mobile ID that identifies the wireless terminal 110.

In response to receiving the trigger message, at 504, the NFC-enabled device 108 transmits a trigger response message to the wireless terminal 110. In the present embodiment, the trigger response message includes a SSID, a device ID, a network identifier, and a mobile ID. As described with reference to FIG. 3, the wireless terminal 110 may validate the trigger response message received from the NFC-enabled device 108 against the trigger message that the wireless terminal 110 initially transmitted using the mobile ID. Furthermore, in various embodiments, other elements such as a random unique identifier or an encrypted version of the mobile ID may be used in place of the mobile ID in the trigger message and trigger response message. Steps 506 and 508 of FIG. 5 are respectively identical to steps 404 and 406 of FIG. 4. As such, a detailed description of steps 506 and 508 is omitted herein.

Figure 6:
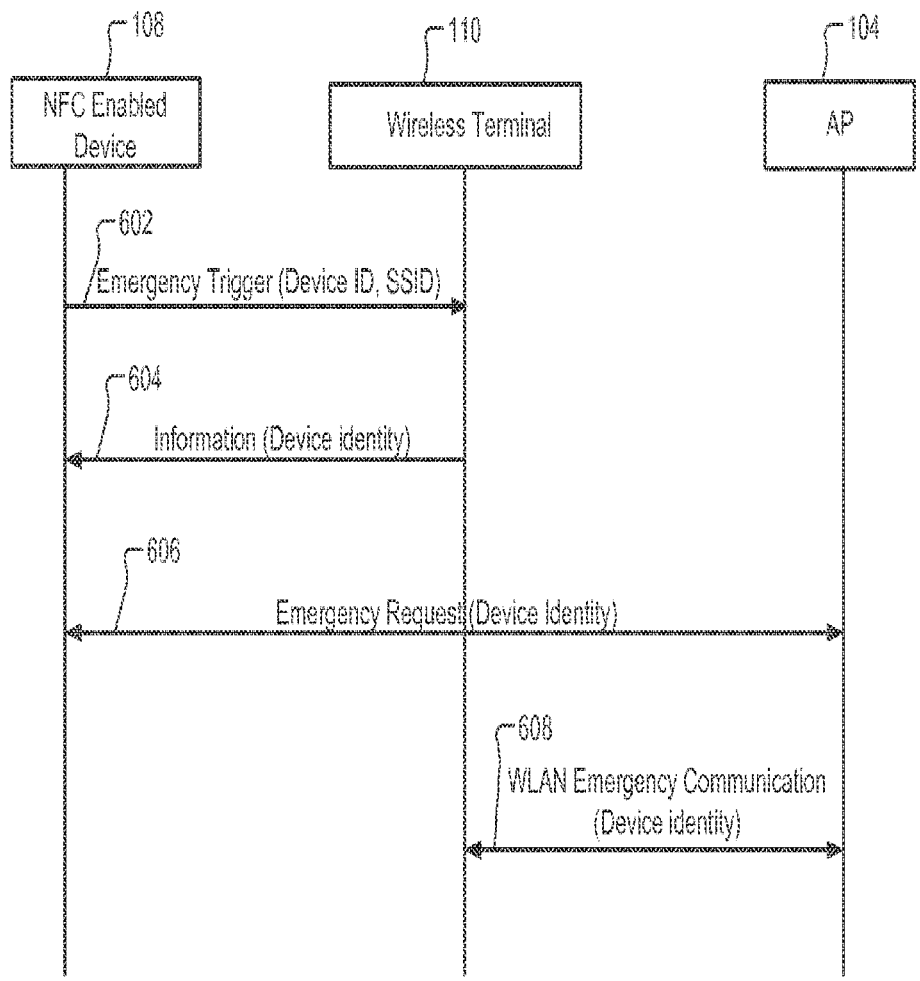
FIG. 6 depicts an exemplary embodiment of an emergency communication support operation in accordance with the present disclosure.

Referring now to FIGS. 1 and 6, an exemplary embodiment of an emergency communication support operation is discussed in more detail. For example, the present embodiment may be utilized to facilitate emergency communications such as, but not limited to, emergency calls and/or SMS messages when a user of a wireless terminal does not have authorization (i.e., the access rights) for the WLAN hotspot. In some embodiments, the NFC-enabled device 108 may be configured specifically for supporting emergency communications over path A. In other embodiments, the user of the wireless terminal 110 may request (e.g., depressing an emergency button, selecting an emergency option from a user interface, issuing a voice command, etc.) emergency services/communications from the wireless terminal 110 at about the same time or prior to coming within range of the NFC-enabled device 108 with the wireless terminal 110. This request would also be communicated over path A from the wireless terminal 110 to the NFC-enabled device 108. In various embodiments, emergency trigger messages may be transmitted (simultaneously or at distinct times) over paths B and C indicating to the WLAN hotspot that support for emergency communications and/or services may be required.

Referring back to FIG. 6, when the mobile terminal 110 is within communication range of the NFC-enabled device 108, at 602, the NFC-enabled device 108 transmits an emergency trigger message to the wireless terminal 110 over path A. The emergency trigger message transmitted by the NFC-enabled device 108 may include an element (e.g., SSID) that serves to identify the WLAN hotspot along with a unique identifier element (e.g., a device ID) for the NFC-enabled device 108. Other information such as emergency call phone numbers and/or dialing digits as well as emergency service uniform resource names (URNs) that are used to reach emergency services (e.g., an emergency responder or public safety answering point) specific to the geographic area of the WLAN hotspot may be provided via the emergency trigger message. Further, information indicative of the WLAN hotspot location and venue type may also be provided. In fact, the present disclosure anticipates providing any information within the emergency trigger message that is mandated to conform to emergency regulations specific to the locale of the WLAN hotspot.

At 604, the wireless terminal 110 transmits an information message to the NFC-enabled device 108. Depending on emergency regulations specific to the locale of the WLAN hotspot, either an identity of the terminal 110 and/or an identity of the user of the terminal 110 or possibly no identity information may be required to initiate an emergency call by the wireless terminal 110. As such, in the present embodiment, the information message may include device information (e.g., a mobile ID) and/or user information that respectively identify the wireless terminal 110 and/or the user of the wireless terminal 110. At 606, the NFC-enabled device 108 transmits an emergency request message that includes the device information of the wireless terminal 110 to the AP 104 (i.e., the WLAN hotspot) using path B or C. The emergency request message requests emergency access to the WLAN hotspot for the wireless terminal 110. In the present embodiment, registration with the hotspot may not be required. In other words, registration by the wireless terminal 110 with the WLAN hotpot may not be a prerequisite to being provided emergency access to the wireless terminal 110. Upon receiving the emergency request message, the hotspot infrastructure verifies the identity of the wireless terminal 110 and the validity of the emergency request. Upon verifying the identity of the wireless terminal 110 and the validity of the emergency request, the hotspot infrastructure allows an emergency communication session to commence between the wireless terminal 110 and a local or an external private network (e.g., the private network 106) via the AP 104 at 608.

Important to note is that emergency access (i.e., emergency communications) is only enabled for the specific wireless terminal 110 that transmitted the initial emergency request message. Further, other traffic (e.g., communications other than emergency communications) to the WLAN hotspot may be halted and/or classified as having a lower transmission or delivery priority relative to the emergency communication session. In other words, the communications associated with the emergency communication session are given higher priority due to their urgent nature.

In some embodiments, prioritization of the emergency call session may be accomplished by providing direct WLAN open access to the wireless terminal 110 using source address filtering. In other words, communications originating (i.e., "sourced") from device addresses other than that of the address of the wireless terminal 110 would be filtered (e.g., halted and/or moved to a lower priority). The address of the wireless terminal 110 may be transmitted to the AP 104 as part of the device information within the information message prior to initiation of the emergency communication session.

In other embodiments, prioritization of the emergency call session may be accomplished by utilizing a unique registration plan 116 such as an emergency registration plan. The emergency registration plan 116 may include registration parameters such as "Information" or "Plan Type", "Online Sign-up", "AccessTimeLimit", "Payment Required", and "Provisioning Required". The "Information" or "Plan Type" registration parameter may be populated as "Emergency". The "Online Sign-up" registration parameter may include fields for providing a full name (first name, last name) parameter and/or a user name parameter. The "AccessTimeLimit" registration parameter may be populated as "24 hours". The "Payment Required" registration parameter may be populated as "No". The "Provisioning Required" registration parameter may be populated as "No".

In some embodiments, the emergency registration plan 116 may only be selectable by the user of the wireless terminal 110 based on an activation of an emergency application at the wireless terminal 110 thereby trying to prevent fraudulent use of communications services for non-emergency use.

Figure 7:
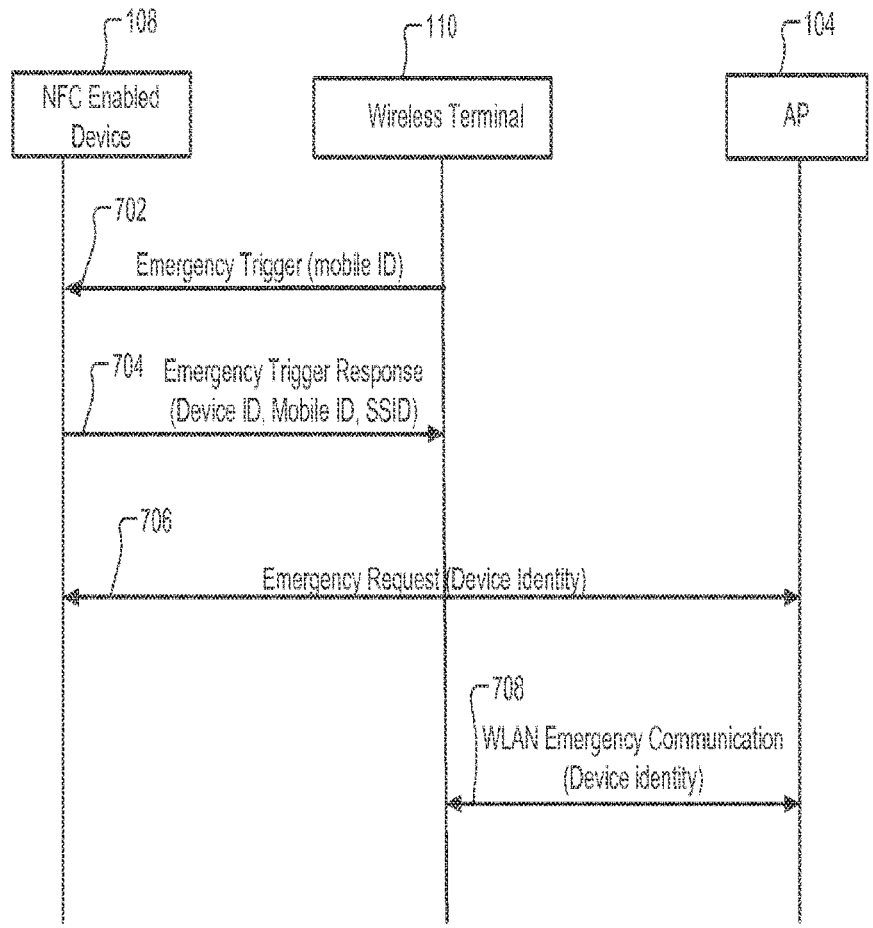
FIG. 7 depicts another exemplary embodiment of an emergency communication support operation in accordance with the present disclosure.

Referring now to FIGS. 1, 6, and 7, another exemplary embodiment of an emergency communication support operation is discussed in more detail. In the present embodiment, the wireless terminal 110 initiates an emergency trigger message. When the wireless terminal 110 is within communication range of the NFC-enabled device 108, at 702, the wireless terminal 110 transmits an emergency trigger message to the NFC-enabled device 108. The emergency trigger message includes an element (e.g., a mobile ID) that identifies the wireless terminal 110 and/or the user. At 704, in response to receiving the emergency trigger message, the NFC-enabled device 108 transmits an emergency trigger response message to the wireless terminal 110. Like the emergency trigger message of FIG. 6, the emergency trigger response message includes an element (e.g., a SSID) that serves to identify the WLAN hotspot along with a unique identifier element (e.g., a device ID) for the NFC-enabled device 108. The emergency trigger response message further includes a mobile ID.

The wireless terminal 110 may validate the emergency trigger response message received from the NFC-enabled device 108 against the emergency trigger message that the wireless terminal 110 initially transmitted at 702. More specifically, the wireless terminal 110 may verify whether the mobile ID received within the emergency trigger response message is the same as the mobile ID transmitted by the wireless terminal 110. If the mobile ID received from the NFC-enabled device 108 is incorrect (i.e., if the mobile ID received from the NFC-enabled device 108 is not the same as the mobile ID transmitted by the wireless terminal 110), the wireless terminal 110 may reject messages from the NFC-enabled device 108. In various embodiments, other elements such as a random unique identifier or an encrypted version of the mobile ID may be used in place of the mobile ID in the emergency trigger message and emergency trigger response message. Steps 706 and 708 of FIG. 7 are respectively identical to steps 606 and 608 of FIG. 6. As such, a detailed description of steps 706 and 708 is omitted herein.

Figure 8:
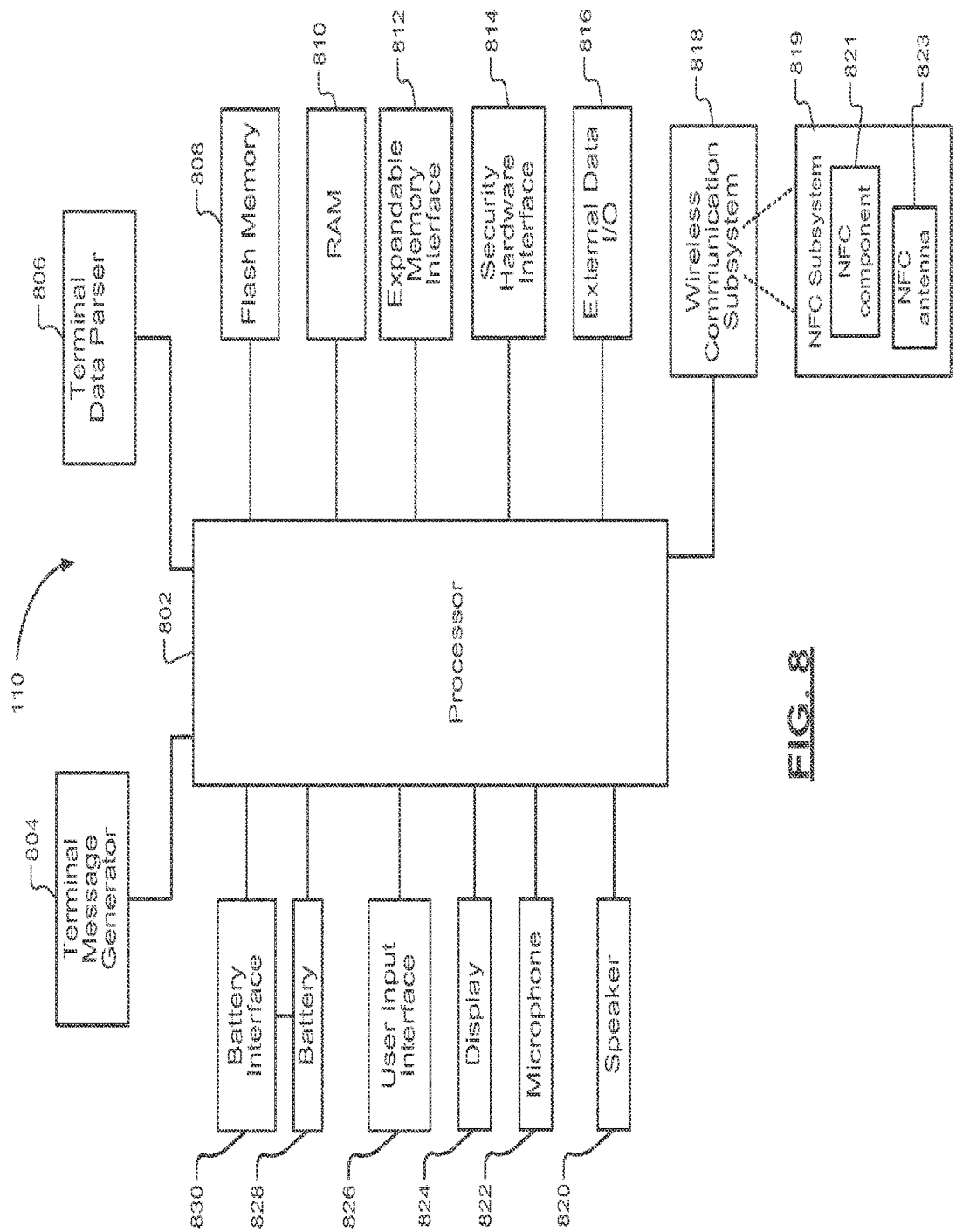
FIG. 8 depicts an exemplary wireless terminal in accordance with the present disclosure.

FIG. 8 illustrates an exemplary wireless terminal 110 as shown in FIG. 1. The wireless terminal 110 includes a processor 802 that may be used to control the overall operation of the wireless terminal 110. The processor 802 may be implemented using a controller, a general purpose processor, a digital signal processor, dedicated hardware, or any combination thereof. The processor 802 may include a central processing unit, a graphics processing unit, a digital signal processor or other type of processing device. The processor 802 may be a component in any one of a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may operate in conjunction with a software program, such as code generated manually (i.e., programmed).

The wireless terminal 110 also includes a terminal message generator 804 and a terminal data parser 806. The terminal message generator 804 may be used to generate registration transaction messages such as messages 112, 114, 118, and 120 depicted in FIG. 1. The terminal data parser 806 may be used to retrieve data from memory (e.g., random access memory 810, etc.). For example, the terminal data parser 806 may retrieve the registration plans 116 that may be cached in the wireless terminal 110 after receipt from a WLAN.

In the illustrated embodiment, the terminal message generator 804 and the terminal data parser 806 are shown as separate from and connected to the processor 802. In alternative embodiments, the terminal message generator 804 and the terminal data parser 806 may be implemented in the processor 802 and/or in a wireless communication subsystem (e.g., a wireless communication subsystem 818). The terminal message generator 804 and the terminal data parser 806 may be implemented using any combination of hardware, firmware, and/or software. For example, one or more integrated circuits, discrete semiconductor components, and/or passive electronic components may be used. For example, the terminal message generator 804 and the terminal data parser 806, or parts thereof, may be implemented using one or more circuits, programmable processors, application specific integrated circuits, programmable logic devices, field programmable logic devices, etc.

The terminal message generator 804 and the terminal data parser 806, or parts thereof, may be implemented using instructions, code, and/or other software and/or firmware, etc. stored on a machine accessible medium and executable by, for example, a processor (e.g., the processor 802). The terminal message generator 804 or the terminal data parser 806 may be stored on or include a tangible storage medium or memory. For example, the terminal message generator 804 or the terminal data parser 806 may be implemented in software stored on a memory that is executable by the processor 802. Alternatively, the terminal message generator 804 and/or the terminal data parser 806 may be implemented in hardware with software functions. The memory for storing software associated with the terminal message generator 804 and/or the terminal data parser 806 may include, but is not limited to, computer readable storage media such as various types of volatile and non-volatile storage media, including random access memory, read-only memory, programmable read-only memory, electrically programmable read-only memory, electrically erasable programmable read-only memory, flash memory, magnetic tape or disk, optical media and the like. In one embodiment, the memory may include the random access memory 810 for the processor 802, or may be an external storage device or database for storing recorded ad or user data. Examples include a hard drive, compact disc ("CD"), digital versatile disc ("DVD"), memory card, eUICC, memory stick, floppy disc, universal serial bus ("USB") memory device, or any other device operative to store ad or user data. The memory is operable to store instructions executable by the processor 802.

The wireless terminal 110 may include a flash memory 808, a random access memory 810, and/or an expandable memory interface 812 coupled with the processor 802. The flash memory 808 may store computer readable instructions and/or data. In some embodiments, the flash memory 808 and/or the RAM 810 may store the network information 120 from FIG. 1 and instructions for communicating that network information 120. The processor 802 may be coupled with the memory (e.g. the flash memory 808, or the RAM 810) for storing software instructions executable by the processor 802. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 802 executing the instructions stored in the memory. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like.

The wireless terminal 110 may include a security hardware interface 814 to receive a SIM card from a wireless service provider. A SIM card may be used for network discovery communications including authentication of the wireless terminal 110 for establishing a connection with a WLAN-supported network. The wireless terminal 110 may be provided with an external data I/O interface 816. The external data I/O interface 816 may be used by a user to transfer information to the wireless terminal 110 through a wired medium.

The wireless terminal 110 may include wireless communication subsystem 818 to enable wireless communications with access points (e.g., the AP 104 of FIG. 1). Although not shown, the wireless terminal 110 may also have a long-range communication subsystem to receive messages from, and send messages to, a cellular wireless network. In the illustrated examples described herein, the wireless communication subsystem 818 can be configured in accordance with the IEEE® 802.11 standard. In other example implementations, the wireless communication subsystem 818 may be implemented using a BLUETOOTH® radio, a ZIGBEE® device, a wireless USB device, an ultra-wideband radio, a NFC device, or a Radio Frequency Identifier ("RFID") device. For example, in the present disclosure, the wireless communication subsystem 818 includes a NFC subsystem 819. The NFC subsystem 819 includes a NFC chip 821 (i.e., an NFC component) as well as a NFC antenna 823. The NFC chip is tuned typically for 13.56 MHz. The NFC chip 821 may be, for example, a processor or a microcontroller-based transmission module that includes analog circuitry and a contact list Universal Asynchronous Receiver Transmitter (UART), a processing core and a set of host interfaces. The analog circuitry could include an output driver, an integrated demodulator, a bit decoder, a mode detector and an RF-level detector. The contact list UART may include elements for data processing, Cyclical Redundancy Checking (CFC), parity generation, framing generation and check bit coding and decoding. A set of host interfaces can interface with the microprocessor and interface according to such known standards as I2C, serial UART, SPI and USB.

The wireless terminal 110 may include a user interface for communicating with the wireless terminal. The user interface may be a separate component or it may include a speaker 820, a microphone 822, a display 824, and a user input interface 826. The display 824 may be a liquid crystal display, an organic light emitting diode display, a flat panel display, a solid state display, a cathode ray tube, a projector, a printer (e.g., a three-dimensional (3D) printer) or other now known or later developed display device for outputting determined information. The user input interface 826 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. In other words, the speaker, 820, the microphone 822, the display 824, the user input interface 826, and/or any combination thereof may be omitted in alternative embodiments. In one embodiment, the wireless terminal 110 is a battery-powered device and includes a battery 828 and a battery interface 830.

Figure 9:
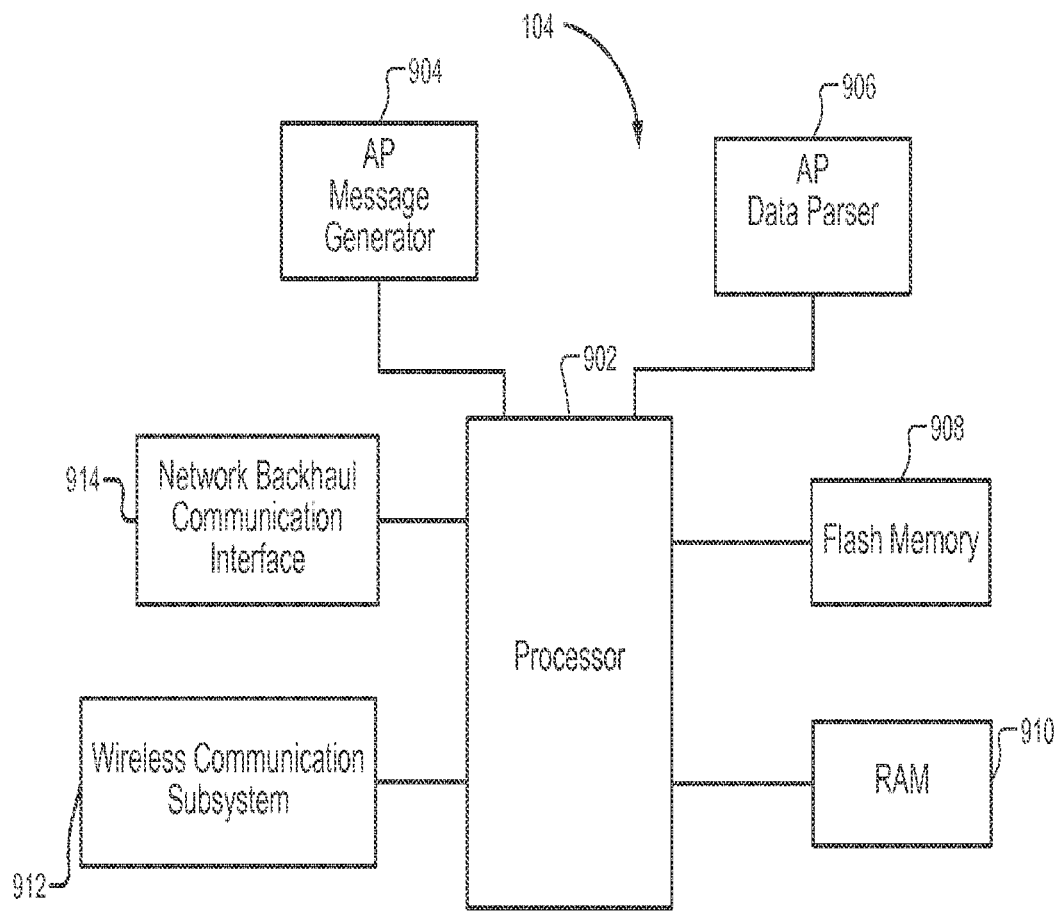
FIG. 9 depicts an exemplary access point in accordance with the present disclosure.

FIG. 9 illustrates an exemplary access point 104. AP 104 includes a processor 902 to perform operations of the AP 104. The processor 902 may be similar to the processor 802 described above. The AP 104 includes an access point message generator 904 to generate network information communications and an access point data parser 906 for retrieving network information communications from the wireless terminal 110 and/or the private network A 106 as illustrated in FIG. 1. The access point message generator 904 may be similar to the terminal message generator 804 of FIG. 8, and the access point data parser 906 may be similar to the terminal data parser 806 of FIG. 8. As with the terminal message generator 804 and the terminal data parser 806 of FIG. 8, the access point message generator 904 and the access point data parser 906 may be implemented in software stored on a memory that is executable by the processor 902 or may be implemented in hardware with software functions executed by the processor 902. Alternatively, the access point message generator 904 and the access point data parser 906 may be implemented in a wireless communication subsystem (e.g., a wireless communication subsystem 912) using any combination of hardware, firmware, and/or software including instructions stored on a tangible computer readable medium and/or a non-transitory computer readable medium.

The AP 104 may also include a flash memory 908 and a RAM 910, both of which are coupled to the processor 902. The flash memory 908 and/or the random access memory ("RAM") 910 may be configured to store network information. The RAM 910 may also be used to generate messages for communication with the wireless terminal 110 and/or to the private network A 106. The RAM 910 may also store received messages communicated by the wireless terminal 110 and/or the private network 106.

To communicate with wireless terminals such as the wireless terminal 110, the AP 104 may include a wireless communication subsystem 912, which may be similar to the wireless communication subsystem 818 of the wireless terminal 110 illustrated in FIG. 8. To communicate with a WLAN-supported network or external network (e.g., the private network of FIG. 1), the AP 104 may include a network uplink communication interface 914.

All of the discussion above, regardless of the particular implementation being described, is exemplary in nature, rather than limiting. Although specific components of the present disclosure are described, methods, systems, and articles of manufacture consistent with the present disclosure may include additional or different components. For example, components of present disclosure may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the apparatus and methods consistent with the present disclosure may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this disclosure.

What is claimed is:

1. A first device, comprising:
a first processor configured to:
transmit a first message to a second wireless device with a second processor using wireless short-range communication when the first device is within communication range of the second wireless device, wherein the first message automatically initiates a registration process with an access point (AP) of a wireless local area network (WLAN) associated with the second wireless device; and
receive a response message from the second wireless device in response to transmitting the first message, wherein the response message comprises a first identifier (ID) that identifies the second wireless device and registration information that identifies the WLAN.

2. The first device of claim 1, wherein the wireless short-range communication includes one of near field communication (NFC), Bluetooth, Zig bee, wireless universal serial bus, or an ultra-wideband technology.

3. The first device of claim 1, wherein the first processor is further configured to determine whether the second wireless device is within communication range of the first device.

4. The first device of claim 1, wherein the first device comprises a non-access point station (non-AP STA) and wherein the wireless short-range communication comprises near field communication.

5. The first device of claim 4, wherein the first processor is further configured to include a mobile ID within the first message, the mobile ID identifying the non-AP STA.

6. The first device of claim 3, wherein the first processor is further configured to automatically transmit the first message to the second wireless device in response to determining that the second wireless device is within communication range of the first device, wherein the first message automatically initiates the registration process to register the first device with the AP without requiring a user of the first device to manually input registration information during the registration process.

7. The first device of claim 1, wherein the first processor is further configured to transmit a WLAN registration request to the AP in response to receiving the response message from the second wireless device, wherein the first device is configured to receive a registration status message in response to transmitting the WLAN registration request to the AP, the registration status message indicating whether the registration process succeeded or failed, and wherein the AP is configured to provide the first device with access to an external network if the registration process succeeded.

8. The first device of claim 1, wherein the second wireless device comprises an NFC-enabled device.

9. The first device of claim 1, wherein the first device comprises a near field communication (NFC)-enabled device and the second wireless device comprises a non-access point station (non-AP STA).

10. The first device of claim 9, wherein the first processor is further configured to include at least one of a second device ID or a service set ID (SSID) within the first message, the second device ID identifying the NFC-enabled device and the SSID identifying the WLAN.

11. The first device of claim 9, wherein the non-AP STA automatically initiates the registration process by transmitting a WLAN registration request message to the AP in response to receiving the first message from the first device, and wherein the non-AP STA transmits the WLAN registration request message to the AP using a transport protocol instead of a WLAN hotspot air interface.

12. A first wireless device, comprising:
a processor configured to:
receive a first message transmitted from a second device using wireless short-range communication when the first wireless device is within communication range of the second device, wherein the first message automatically initiates a registration process with an access point (AP) of a wireless local area network (WLAN) associated with the first wireless device, further wherein the wireless short-range communication provides for communications to and from the second device, and wherein the first message is transmitted by the second device;
transmit a response message to the second device, the response message comprising a first identifier (ID) that identifies at least one of the first or second wireless device and registration information that identifies the WLAN.

13. The first wireless device of claim 12, wherein the wireless short-range communication includes one of near field communication (NFC), Bluetooth, Zig bee, wireless universal serial bus, or an ultra-wideband technology.

14. The first wireless device of claim 12, wherein the processor receives the first message from the second device when the first wireless device is within communication range of the second device, the first message being automatically transmitted by the second device.

15. The first wireless device of claim 12, wherein the first wireless device comprises a non-access point station (non-AP STA) and wherein the wireless short-range communication comprises near field communication (NFC).

16. The first wireless device of claim 15, wherein the processor is further configured to receive the device ID within the first message, the device ID identifying a NFC-enabled device.

17. The first wireless device of claim 16, wherein the processor is further configured to automatically initiate the registration process by transmitting a WLAN registration request message to the AP in response to receiving the first message from the second device, and wherein the first wireless device transmits the WLAN registration request message to the AP using a transport protocol instead of a WLAN hotspot air interface.

18. The first wireless device of claim 17, wherein the processor is further configured to include at least one of the device ID, an ID associated with the non-AP STA, or an authentication credential associated with the non-AP STA within the WLAN registration request message.

19. The first wireless device of claim 16, wherein the processor is further configured to transmit an information message in response to receiving the first message.

20. The first wireless device of claim 19, wherein the processor is further configured to include at least one of device information that identifies the non-AP STA or user information that identifies a user of the non-AP STA within the information message.

21. The first wireless device of claim 12, wherein the first wireless device comprises a near field communication (NFC)-enabled device and the second device comprises a non-access point station (non-AP STA).

22. The first wireless device of claim 21, wherein the processor is further configured to receive a mobile ID within the first message, the mobile ID identifying the non-AP STA.

23. The first wireless device of claim 21, wherein the first message further comprises the device ID.

24. The first wireless device of claim 12, wherein the response message further comprises at least one of a mobile ID, or a network identifier that identifies a network to which the WLAN is connected to or to which the WLAN is associated with within the response message.

25. A method, comprising:
transmitting, by a first device, a first message to a second wireless device using wireless short-range near field communication (NFC), wherein the first device comprises a near field communication (NFC)-enabled device and the second wireless device comprises a non-access point station (non-AP STA), wherein the first message automatically initiates a registration process with an access point (AP) of a wireless local area network (WLAN) associated with the second wireless device, wherein the first message is transmitted to the second wireless device when the first device is within communication range of the second wireless device; and
receiving, in response to the first message, a response message that includes a first identifier (ID) which is a device ID that identifies the second wireless device, and registration information that identifies the WLAN.

26. The method of claim 25, further comprising transmitting a WLAN registration request from the first device to the AP in response to receiving the response message from the second wireless device.

27. The method of claim 25, wherein the response message includes a mobile identifier (ID), a second device ID that identifies the NFC-enabled device, and a service set ID (SSID) that identifies the WLAN.

28. The method of claim 25, wherein the first message includes at least one of the device ID or a service set ID (SSID), the device ID identifying the NFC-enabled device and the SSID identifying the WLAN.

29. The method of claim 25, further comprising the non-AP STA automatically initiating the registration process by transmitting a WLAN registration request message to the AP in response to receiving the first message from the first device, the registration process being configured to register the first device with the AP without requiring a user to manually input registration information during the registration process.

30. A method, comprising:
receiving, by a first wireless device, a first message transmitted from a second device using short-range near field communication (NFC), wherein one of the first wireless device or the second device is a NFC-enabled device and one is a non-access point station (non-AP STA), such that the first message includes a first identifier (ID) identifying the NFC-enabled device, wherein the first message automatically initiates a registration process with an access point (AP) of a wireless local area network (WLAN) associated with the first wireless device, wherein the first message is received from the second device when the first wireless device is within communication range of the second device, the first message being transmitted by the second device; and
transmitting, by the first wireless device, a response message to the second device, wherein the response message comprises the first ID and registration information that identifies the WLAN.

31. The method of claim 30, wherein the first wireless device comprises the non-access point station (non-AP STA) and the second device comprises the NFC-enabled device.

32. The method of claim 30, wherein automatically initiating the registration process comprises the first wireless device transmitting a WLAN registration request message to the AP in response to receiving the first message from the second device, wherein the registration process is configured to register the second device with the AP without requiring a user of the second device to manually input registration information, and wherein the first wireless device transmits the WLAN registration request message to the AP using a transport protocol instead of a WLAN hotspot air interface.

33. The method of claim 30, further comprising including at least one of the device ID, an identifier associated with the non-AP STA, or an authentication credential associated with the non-AP STA within the WLAN registration request message.

34. The method of claim 30, further comprising transmitting an information message in response to receiving the first message.

35. The method of claim 34, wherein the information message includes at least one of device information that identifies the non-AP STA or user information that identifies a user of the non-AP STA.

36. The method of claim 30, wherein the first wireless device comprises the near field communication (NFC)-enabled device and the second device comprises the non-access point station (non-AP STA).

37. The method of claim 36, wherein the first message includes a mobile ID identifying the non-AP STA.

38. The method of claim 30, wherein the response message is transmitted in response to the first message.

39. The method of claim 38, wherein the response message further includes at least one of a mobile ID, or a network identifier that identifies a network to which the WLAN is connected to or to which the WLAN is associated with.

* * * * *